United States Patent [19]

Ulschmid et al.

[11] Patent Number: 5,361,567
[45] Date of Patent: Nov. 8, 1994

[54] MULTI-PIECE TOOL BAR ASSEMBLY FOR AN AGRICULTURAL IMPLEMENT

[75] Inventors: Timothy G. Ulschmid, Oak Creek, Wis.; Michael J. Covington, LaGrange, Ill.

[73] Assignee: Case Corporation, Racine, Wis.

[21] Appl. No.: 9,571

[22] Filed: Jan. 26, 1993

[51] Int. Cl.$^5$ ........................ A01D 46/08; A01D 67/00
[52] U.S. Cl. ............................................ 56/13.5; 56/28;
56/DIG. 9; 172/656; 403/14
[58] Field of Search ................ 56/13.5, 28, 30, 33,
56/34, 35, 36, DIG. 9; 172/654, 656, 645, 649;
403/13, 14

[56] References Cited

U.S. PATENT DOCUMENTS

| | | | |
|---|---|---|---|
| 4,225,191 | 9/1980 | Knuski | 403/13 X |
| 4,249,365 | 2/1981 | Hubbard et al. | 56/13.2 |
| 4,344,271 | 8/1982 | Schlueter et al. | 56/13.6 |
| 4,509,603 | 4/1985 | Adams | 172/427 |
| 4,803,830 | 2/1989 | Junge et al. | 56/28 |
| 4,815,259 | 3/1989 | Scott | 56/6 |
| 4,828,043 | 5/1989 | Karlsson | 172/656 |
| 4,896,492 | 1/1990 | Junge et al. | 56/28 |
| 5,063,728 | 11/1991 | Garter et al. | 56/13.5 |

FOREIGN PATENT DOCUMENTS

1427010 3/1976 United Kingdom .................. 403/14

Primary Examiner—David J. Bagnell
Attorney, Agent, or Firm—Rudnick & Wolfe

[57] ABSTRACT

A multi-piece tool bar assembly including a main support structure suited for connection to a frame of an agricultural implement and a second support structure selectively attachable in end-to-end abutting relation with the main support structure for extending the effective length of the tool bar assembly. A fastener assembly initially aligns support surfaces on the support structures relative to each other and thereafter maintains such alignment to facilitate movement of one or more row units onto the second support structure. The fastener assembly is arranged wholly within the exterior of the support structures and comprises a guide pin which extends beyond an abutting end of one of the support structures and is accommodated in a close sliding fit relationship within an opening defined at the abutting end of the other support structure. The guide pin and opening are precisely located on the respective support structures to ensure alignment of the support surfaces of the support structures. Threaded fasteners releasably interconnect the support structures to each other and furthermore maintain the support surfaces in alignment relative to each other.

6 Claims, 6 Drawing Sheets

MULTI-PIECE TOOL BAR ASSEMBLY FOR AN AGRICULTURAL IMPLEMENT

FIELD OF THE INVENTION

The present invention generally relates to agricultural implements and, more particularly, to a multi-piece tool bar assembly suited for connection to a frame of an agricultural implement and on which a plurality of row units are mounted for lateral movement between opposite ends of the tool bar assembly.

BACKGROUND OF THE INVENTION

Farmers are continually trying different spacing between adjacent crop rows to maximize productivity and to accomplish the greatest yield from their acreage. Accordingly, an agricultural implement used to plant seeds along a row must allow the planter row units to be laterally moved relative to each other to accommodate for various row spacings. Similarly, an agricultural implement used to harvest the crop must allow the harvesting row units to be laterally moved relative to each other to accommodate variations in row spacings.

In cotton fields, row spacings between adjacent rows of cotton plants may vary between about 30 and about 40 inches. A typical cotton harvester includes between two and five harvesting row units mounted on a tool bar assembly at a forward end of the harvester. As will be appreciated, harvesting five rows of cotton plants wherein adjacent plant rows are spaced about 40 inches apart or in a skip-row pattern requires a tool bar assembly which is substantially longer than that required for harvesting two, three, or four narrowly spaced rows planted in a solid planting pattern.

Whether it be for cotton harvesters, planters, or other forms of agricultural implements which have row units adapted for lateral adjustment, providing a one-piece tool bar assembly for accommodating all the various accommodations of row spacings and harvesting capacity is impractical to the manufacturer and to the farmer. In view of today's economics, a farmer wanting a tool bar assembly for mounting two or three row units does not want the added cost, weight, and inconvenience of a tool bar assembly which is wider than that required. Moreover, a one-piece tool bar which is lengthwise sized to accommodate five cotton harvester row units arranged in a solid or skip-row pattern relative to each other is too wide for conveniently transporting the agricultural implement from one field to another and can interfere with and thus inadvertently remove crop materials from or cause damage to adjacent plant rows as the implement is driven across a field.

Having separate one-piece tool bar assemblies adaptable for two, three, or four row units results in increased manufacturing cost, area distribution cost, and inhibits a farmer from subsequently increasing the row unit capacity of his agricultural implement unless he buys a wider tool bar than that necessarily required at the time. In addition to problems incurred in their manufacture, wider tool bar assemblies present problems in that they are difficult to ship from one location to another and are inconvenient to handle.

Recent advancements in agricultural equipment, and particularly, in the field of cotton harvesters, allows the harvesting row units to be laterally moved relative to each other along the length of the tool bar. As will be appreciated, lateral movement of the row units relative to each other further elongates the design of the tool bar assembly on which the row units are mounted thereby further complicating the problem of providing a single tool bar assembly for a particular model of agricultural equipment.

Multi-piece tool bar assemblies are not without problems. A major problem with such heretofore known multi-piece tool bar assemblies concerns providing a continuous support surface along which the row units can be laterally moved. Although similar in cross section, a tool bar extension which is to be added to a main tool bar to extend the effective length between opposite ends of the tool bar assembly must have sufficient strength to support one or more row units adapted to be supported thereon and must be aligned with the main tool bar to promote lateral movement of one or more row units thereunto. Additionally, the tool bar extension should be easily and readily matable with the main tool bar so as not to require extensive manual efforts to accomplish addition and removal of the extension from the main tool bar when required.

Thus, there is a need and a desire for a multi-piece tool bar assembly which is suited for use with an agricultural implement and includes one or more support structures which can be readily and releasably fastened to a main support structure to allow the length of the tool bar assembly to be customized to a particular agricultural implement with which it finds utility.

SUMMARY OF THE INVENTION

In view of the above, and in accordance with this invention, there is provided a tool bar assembly suited for connection to a frame of an agricultural implement and on which a plurality of row units are mounted for lateral movement between opposite ends of the tool bar assembly. The tool bar assembly includes a main support structure and an auxiliary support structure selectively and releasably attached to each other by a fastener assembly. The support structures have similar cross-sectional configurations including horizontal and vertical exterior support surfaces along which the row units laterally move. The fastener assembly releasably connects the support structures in abutting end-to-end relation relative to each other thereby extending the effective length of the tool bar assembly to provide additional row unit capacity and accommodate lateral movements of the row units between opposite ends of the tool bar assembly.

The fastener assembly includes a guide pin arranged within the exterior support surfaces and which is precisely located on and extends beyond the end of one support structure. The guide pin is snugly received within a sized opening precisely located toward the abutting end of the other support structure. The precise location of the guide pin and opening aligns like horizontal and vertical support surfaces on the support structures relative to each other. A pair of fasteners arranged wholly within the exterior configurations of the tool bar assembly connect the support structures to each other and maintain the support surfaces in relative alignment such that the tool bar assembly is provided with substantially continuous support surfaces between opposite ends thereof and along which the row units are permitted to laterally move.

In a most preferred form of the invention, and to promote strength and rigidity for the tool bar assembly, each support structure is comprised of first and second vertically attached members. The first member defines first and second support surfaces extending between opposite ends of the respective support structure and along which at least one row unit is supported for lateral movement. The second member defines a third support surface extending between opposite ends of the respective support structure and along which said at least one row unit is supported for lateral movement.

In this embodiment of the tool bar assembly, first and second pin members are used to align the support surfaces of the support structures. The first pin member is precisely located relative to the first and second support surfaces of the first member of the respective support structure from which it extends. The second pin member is precisely located third and fourth predetermined distances from the first pin member and the third support surface of the second member of the respective support structure, respectively. Precisely located first and second openings are defined toward the abutting end of the other support structure for receiving and snugly accommodating the guide pins thereby effecting alignment of the support surfaces on the respective support structures.

To facilitate alignment of the third surfaces on the support members, the third predetermined distance between the first and second guide pins is measured on an arc of a circle having a center at the axis of the first pin. Likewise, the sized first and second openings for receiving and accommodating the first and second guide pins are separated by the same predetermined distance which is measured on an arc of a circle having a center at the axis of the uppermost opening.

The guide pin arrangement of the fastener assembly offers unique advantages for the present invention. The releasable and yet close fit association between the guide pin and respective sized opening promotes alignment of the support surfaces on the abutting support structures without requiring extensive manual assembly efforts. While affording advantageous alignment characteristics, the limited exterior surface area of the guide pin arrangement allows quick release of the support structures from each other with minimal manual efforts. Therefore, it is possible to readily add an extension to the main support of the tool bar assembly thus making it easy and convenient to accommodate numerous combinations of row spacings and allow the row units to be laterally moved relative to each other. Moreover, the guide pins add strength to the tool bar assembly and offer excellent shear strength qualities to prevent the auxiliary support member from rotating relative to the main support member under the influence of row unit weight.

The ability to readily add extensions to the main support structure allows the tool bar assemblies to be shipped in relatively convenient transport widths which can be easily and conveniently extended by adding auxiliary supports thereto to provide additional row capacity and accommodate lateral movements of the row units. The ability to add extensions to the main support structure improves the shipping configuration of the agricultural implement. Moreover, production costs are reduced since modular unit extensions can be added to the main support structure to facilitate mounting of row units and various row configurations.

Numerous other features and advantages of the present invention will become readily apparent from the following detailed description, the accompanying drawings, and the appended claims.

DESCRIPTION OF THE PRESENT INVENTION

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Figure 1:
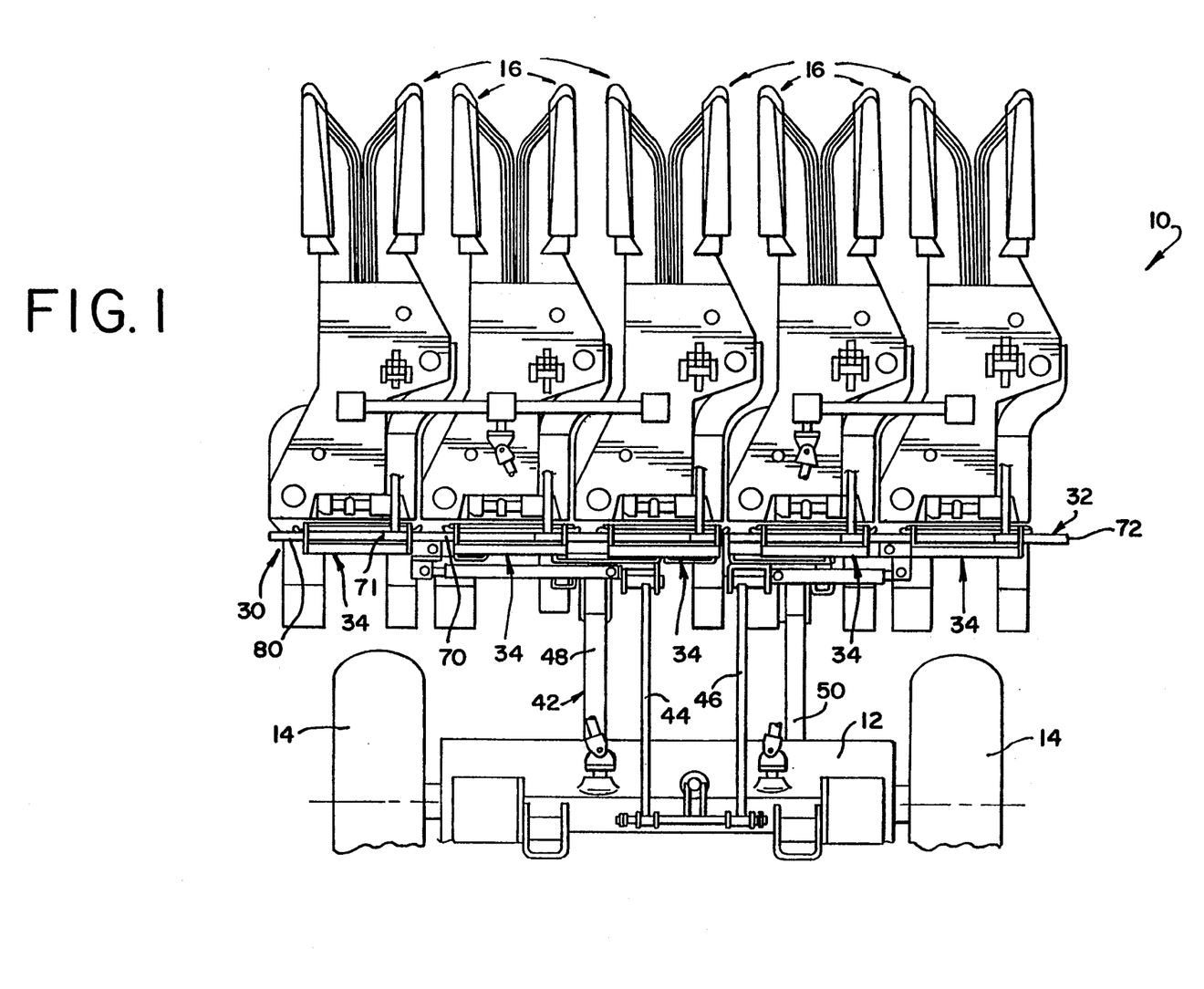
FIG. 1 is a plan view of one form of agricultural implement, such as a cotton harvester, incorporating a tool bar assembly embodying principles of the present invention.

Referring now to the drawings, wherein like reference numerals indicate like parts throughout the several views, there is shown an agricultural implement which is depicted only fragmentarily and as seen is represented in its entirety in FIG. 1 by reference numeral 10. For purposes of this description, the agricultural implement 10 is in the form of a self-propelled cotton harvester. It will be appreciated, however, that the present invention is equally applicable to other forms of agricultural implements having row units mounted thereon for lateral movement relative to a frame of the implement.

Cotton harvester 10 has a fore-and-aft extending frame or chassis 12 mounted on steerable wheels 14. Positioned forwardly of the frame 12 are a plurality of individual harvesting row units 16. As illustrated, the harvesting row units are arranged side-by-side for harvesting adjacent and generally parallel rows of cotton. It should be appreciated, however, that this invention equally applies to a lesser or greater number of row units than that illustrated.

In a preferred form of the invention, each row unit 16 is substantially similar in structure. Accordingly, a description of one row unit will suffice for an understanding of all the row units.

Figure 2:
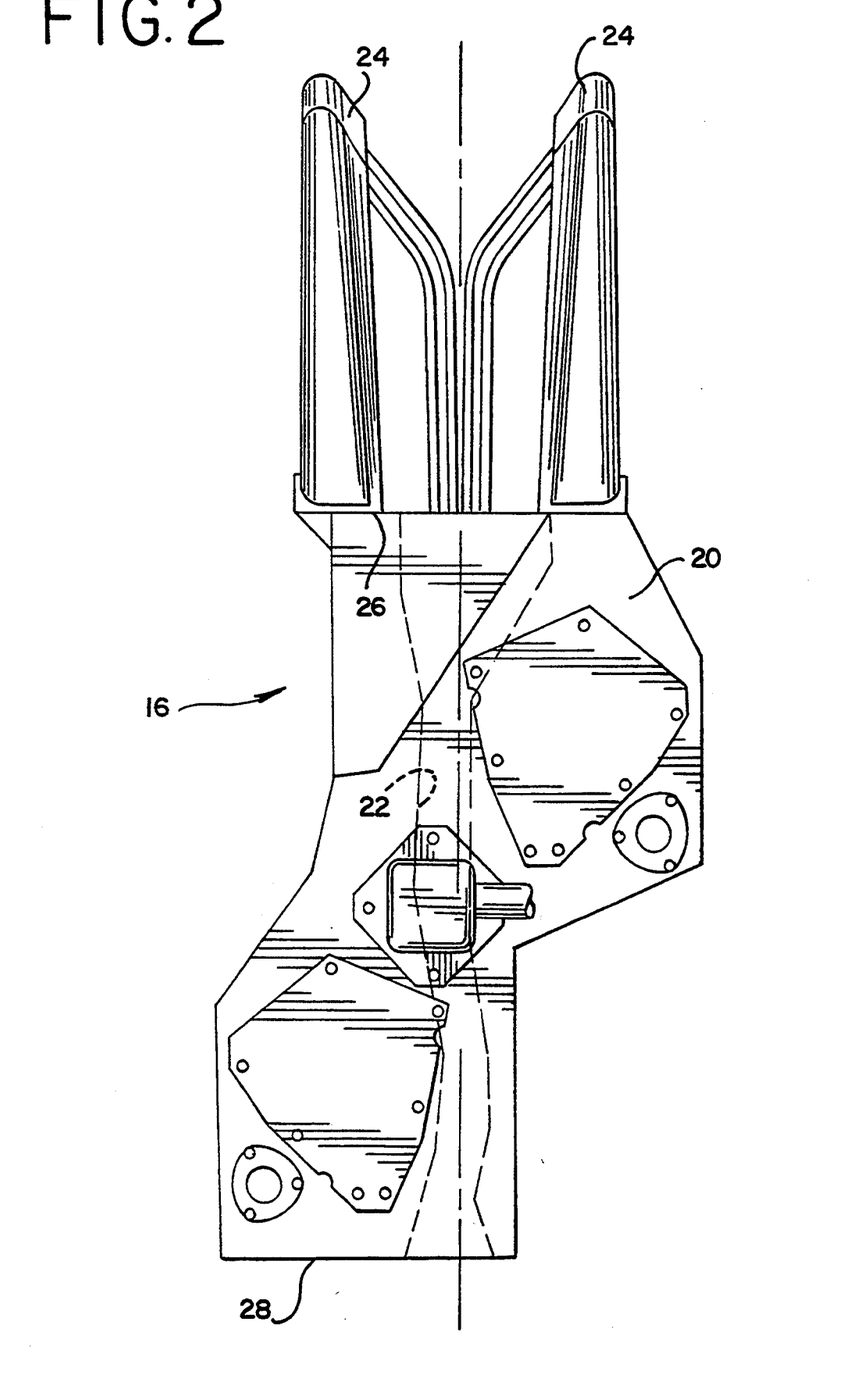
FIG. 2 is a plan view of a harvesting row unit.

Turning to FIG. 2, each row unit 16 includes a housing 20 defining a fore-and-aft crop receiving opening or passage 22 allowing the plant row to pass therethrough. A pair of stalk lifters 24 extend from a forward end 26 of the housing 20. As will be described hereinafter, each harvesting row unit 16 is preferably supported at a rear end 28 of the unit. Although considerable design effort has resulted in row units of reduced size and weight, the usage and required operation of such row units mandates a relatively large size apparatus having considerable weight.

An apparatus, indicated generally by reference numeral 30 in FIG. 1, is provided for mounting the row units 16 for lateral movement relative to the frame 12 of the implement 10. Apparatus 30 of the present invention includes a laterally elongated tool bar assembly 32 connected to frame 12 in a generally horizontal disposition and individual support structures 34 associated with and connecting each row unit 16 to the tool bar assembly 32 for lateral movement along continuous support surfaces extending between opposite ends of the tool bar assembly 32.

In a preferred form of the invention, a lift assembly 42 connects the row unit mounting apparatus 30 to frame 12. Lift assembly 42 preferably operates as a four-bar parallelogram type linkage which is pivotally connected to and extends forward from the frame 12 for securing the row units to the implement and for elevational positioning the row units relative to the implement frame 12.

As illustrated in FIG. 1, lift assembly 42 includes a pair of laterally spaced upper tension arms 44 and 46 which extend generally parallel to a lower pair of laterally spaced lift arms 48 and 50. Rearward ends of the tension arms 44, 46 and lift arms 48, 50 are pivotally attached to the frame 12 in vertically spaced alignment and for angular displacement relative to the frame 12. Forward ends of tension arms 44, 46 and lift arms 48, 50 are pivotally connected in vertically spaced alignment to each other. Preferably, the tool bar assembly 32 is connected to and extends across the lift arms 48, 50. The tension arms 44, 46 have an effective length which is approximately equal to that of the lift arms 48, 50, respectively, and, therefore, the row units 16 connected thereto are maintained in a generally level attitude during field operation as they are elevationally positioned relative to the implement frame 12.

Figure 3:
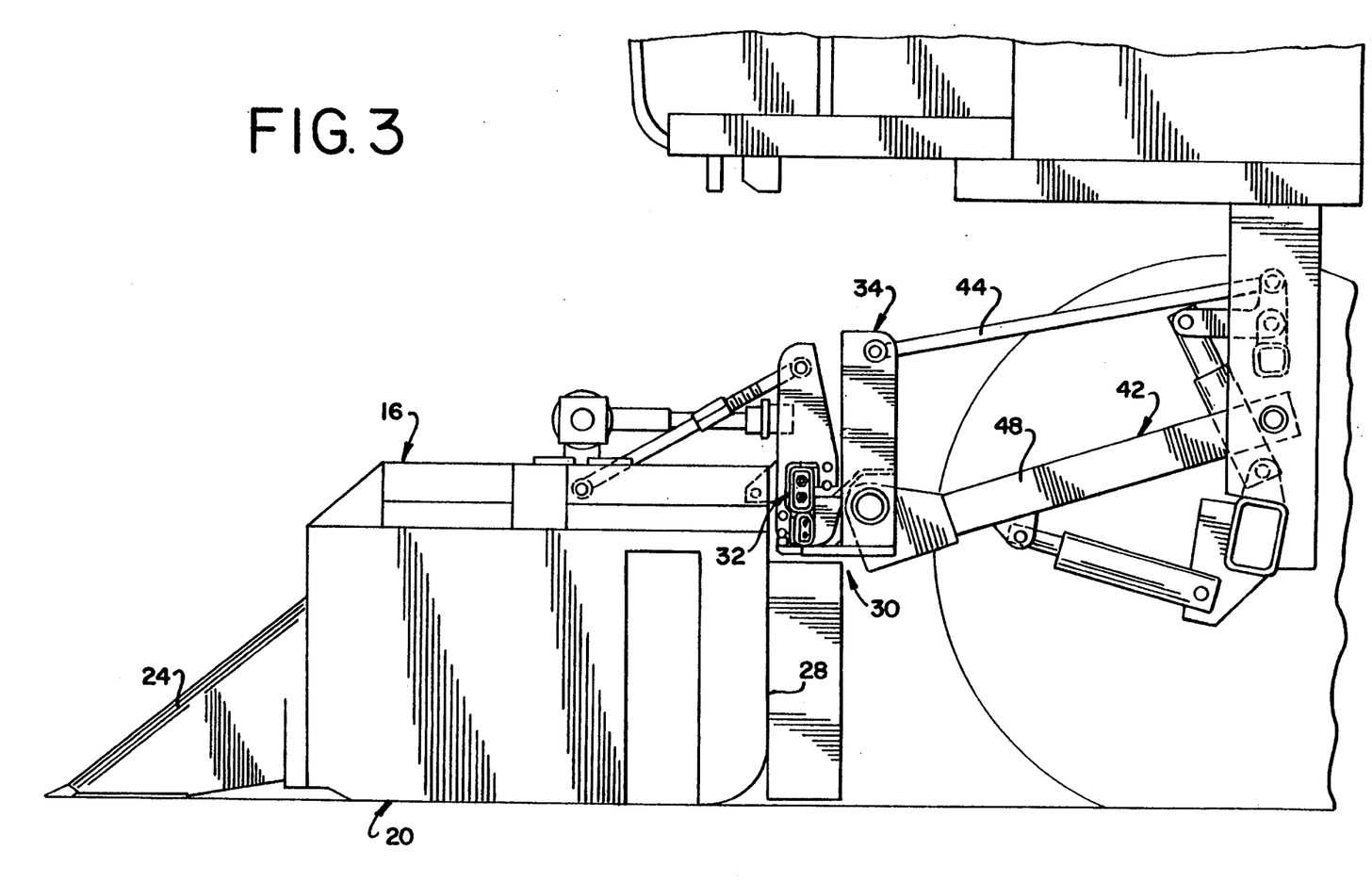
FIG. 3 is a fragmentary side elevational view of the agricultural implement illustrated in FIG. 1.

Each row unit support structure 34 moves over support surfaces defined by the tool bar assembly 32 and connects a respective row unit to the tool bar assembly 32 to allow independent lateral movement along and between the ends thereof while concurrently inhibiting turning movements of the row unit about the elongated length of the tool bar assembly 32. In the illustrated embodiment, the support structure 34 is advantageously provided toward the rear end 28 of the row unit housing 20. As shown in FIG. 3, the rearward location of the support structure 34 permits each row unit to hang off of and forwardly from the tool bar assembly 32 in a manner providing increased access between the row units and unobstructed operator visibility to the forward end of the row unit from a cab region on the implement 10.

In the illustrated embodiment, each support structure 34 is substantially identical in construction and is preferably constructed in accordance with co-assigned U.S. Pat. No. 5,010,718 granted Apr. 30, 1991 and entitled "SYSTEM FOR MOUNTING AND SUPPORTING HARVESTING UNITS OF A COTTON HARVESTER." As fragmentarily illustrated in FIG. 4, each support structure 34 includes a generally horizontal extending channel-shaped bracket 52, an upstanding generally U-shaped lever arm 54, and a horizontally disposed support pin 56 which attaches the respective row unit 16 to the support structure.

Figure 4:
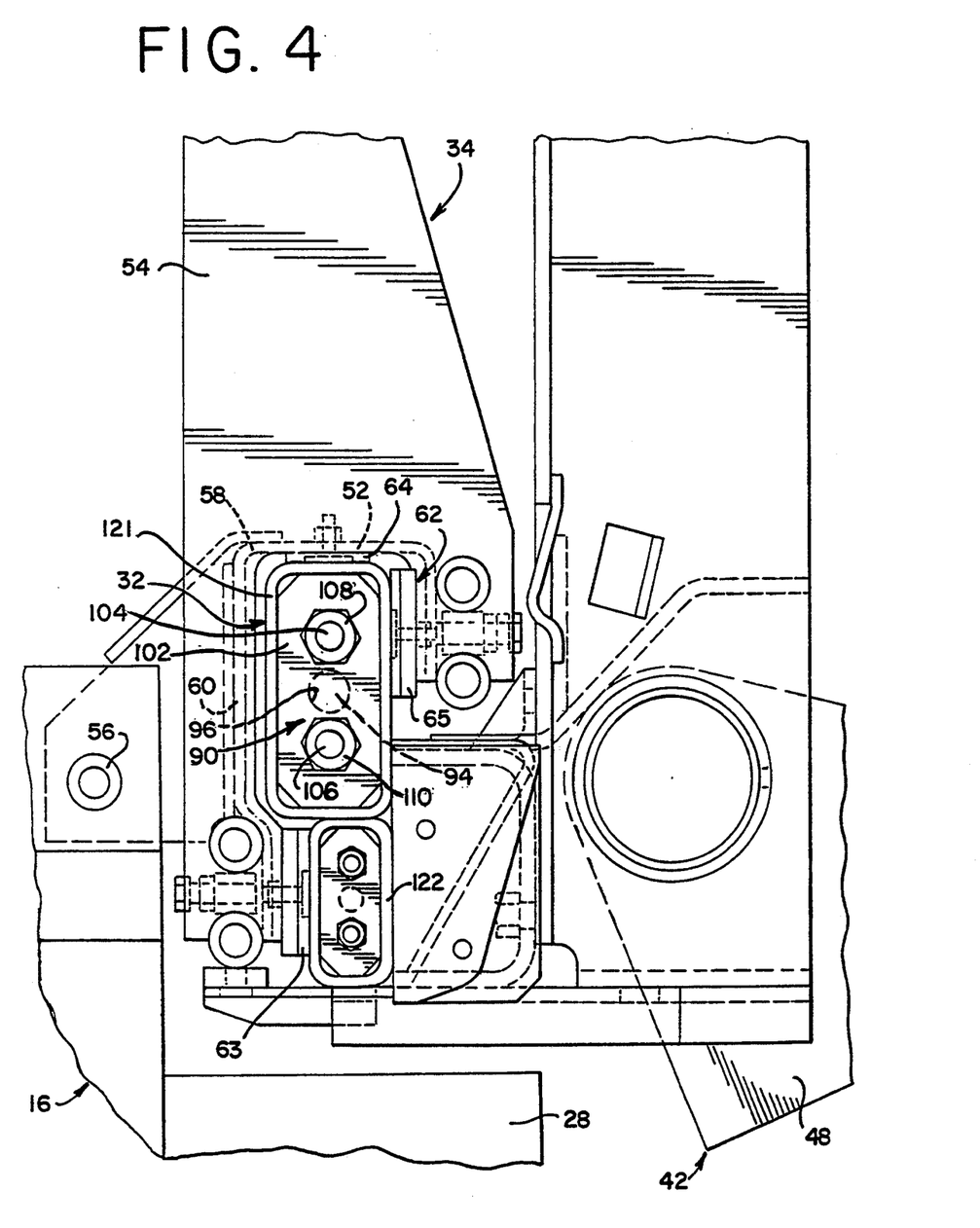
FIG. 4 is an enlarged fragmentary view of a tool bar assembly embodying principles of the present invention.

Preferably, bracket 52 and lever arm 54 are integrally formed from a weldment or casting. As illustrated in FIG. 4, bracket 52 is adapted to straddle and move along the support surfaces of the tool bar assembly 32. In the illustrated embodiment, each bracket includes a fore-and-aft extending leg section 58 which is preferably joined to a generally vertical leg section 60. The length of each leg section 58, 60 is substantially equal to the width of lever arm 54.

Bracket 52 further includes a laterally extending adjustable support 62. In the preferred embodiment, support 62 is substantially equal to the width of and is suitably connected to lever arm 54. As illustrated, support arm 62 entraps the elongated tool bar assembly 32 between it and vertical leg section 60 of bracket 52. The straddling or embracing relationship between bracket 52 and the tool bar assembly 32 permits the substantial weight of the harvesting unit connected thereto to be spread over a substantial surface area to permit lateral movement of the row unit along the tool bar assembly while inhibiting rotational movement thereof about the longitudinal axis of the tool bar assembly 32.

To facilitate movement of the row units relative to the tool bar assembly, relatively low friction and durable surfaces are provided between confronting faces on each support structure 34 and the support surfaces of the tool bar assembly 32. In one form, such low friction durable surfaces may be provided by dipping, spraying, or otherwise applying a powder coating on the tool bar assembly. Such powder coating may be of the type sold by Atochem Company of Glenrock N.J., under the name Rilsan-Nylon II. Alternatively, a series of inserts 63, 64, and 65 are interposed between confronting surfaces on each support structure 34 and the support surfaces on the tool bar assembly 32 for facilitating lateral movement of the row unit along the length of the tool bar structure. Such inserts are preferably formed from a relatively low friction material such as a 1900 ultra-high molecular weight polyethylene material sold by Himont Company of Wilmington, Del. Such inserts can also be fabricated from brass or other suitable metals or metal alloys which facilitate sliding movement between the two surfaces.

Returning to FIG. 1, the tool bar assembly 32 includes a first or main support structure 70 and at least one extension or second support structure 80 releasably affixed to the main support structure in end-to-end relationship therewith. To extend the width of the main support structure 70, the auxiliary support structure 80 is selectively secured thereto by a fastener assembly 90 to effectively extend the length of the tool bar assembly 32 along which one or more row units are laterally moved.

Figure 5:
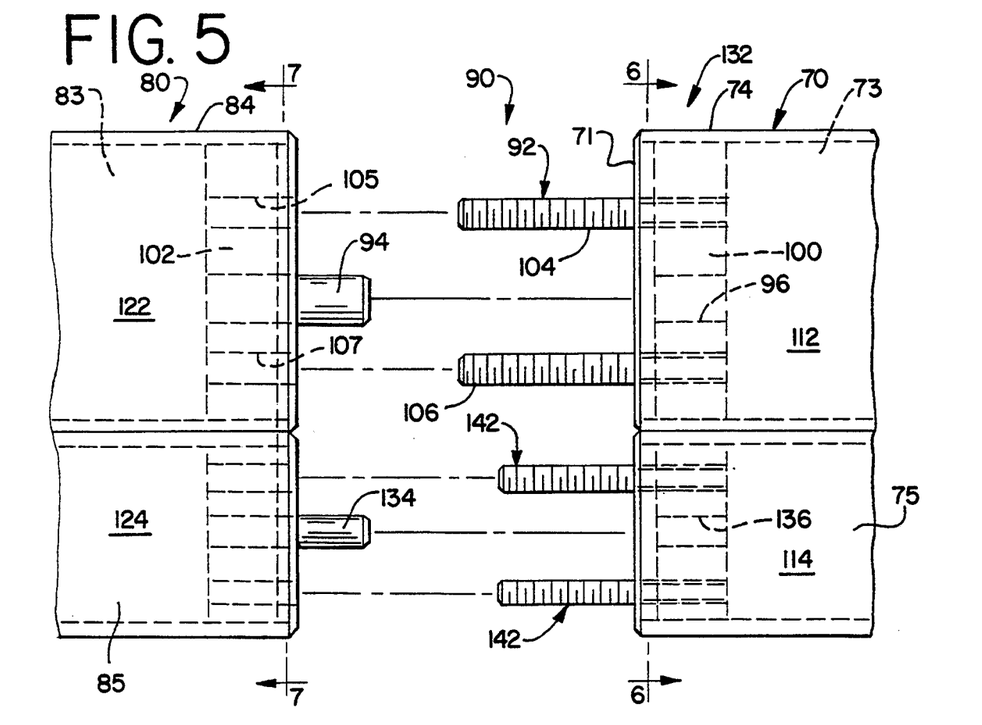
FIG. 5 is an enlarged and fragmentary rear elevational view of the tool bar assembly including first and second support structures arranged in disassembled relation relative to each other.

The main support structure 70 has first and second ends 71 and 72, respectively. As shown in FIG. 5, the first or main support structure is configured with generally flat support surfaces 73, 74, and 75 extending laterally between the ends 71, 72 thereof with support surfaces 73 and 75 having a generally upright or vertical orientation and which are spaced in a fore-and-aft relation relative to each other. Surface 74 generally extends horizontal and in a fore-and-aft direction.

The cross-sectional configuration of the second support structure 80 substantially corresponds to that of the first support structure. As shown in FIG. 5, the extension or second support structure 80 is provided with generally flat support surfaces 83, 84, and 85 extending laterally between the ends of the extension. Moreover, the extension 80 has a hollow interior configuration extending along the entire length thereof.

In its preferred form, the attaching assembly 90 comprises a pair of fasteners 92 for fastening the support structures 70 and 80 in end-to-end abutting relation relative to each other and a guide pin 94 which axially extends beyond the abutting end of one of the support structures and coacts with an opening 96 provided at the abutting end of the other support structure. In a most preferred form of the invention, and for reasons discussed hereinafter, pin 94 is affixed to and extends outwardly from the extension 80. During assembly, the guide pin 94 coacts with the opening 96 to align the support surfaces 73, 74, and 75 on support structure 70 with the support surfaces 83, 84, and 85 on the second support structure or extension 80.

Figure 6:
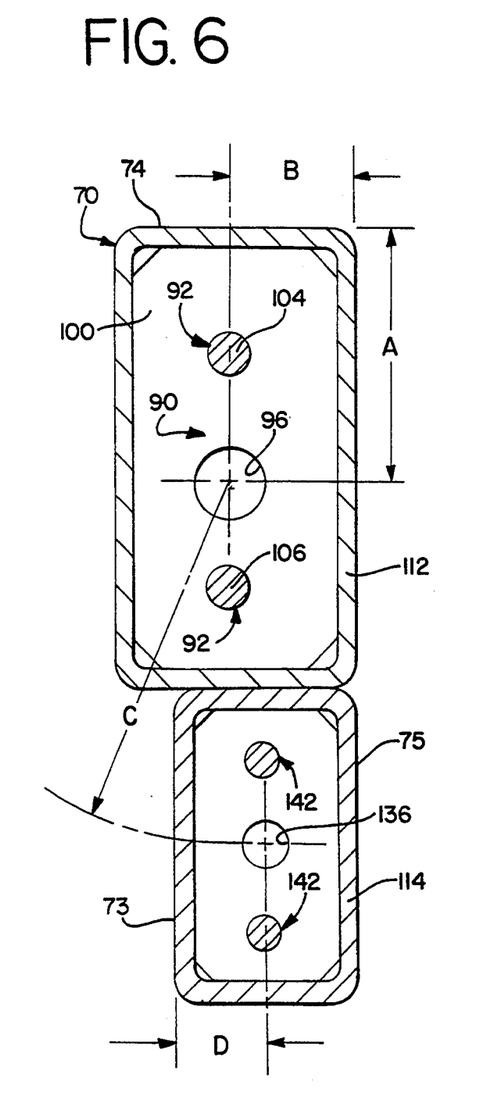
FIG. 6 is a sectional view taken along line 6—6 of FIG. 5.

To lessen its weight and thereby enhance its handling and transportation, in the illustrated embodiment, the mainframe 70 has a hollow interior configuration. A web or block 100 is formed integral with or otherwise fixedly attached to the interior of the main support structure 70 toward one end thereof. As shown, the opening 96 is provided in the web 100. Notably, and as shown in FIG. 6, opening 96 is centered a first predetermined distance A from support surface 74 and a second predetermined distance B from support surface 75.

Figure 7:
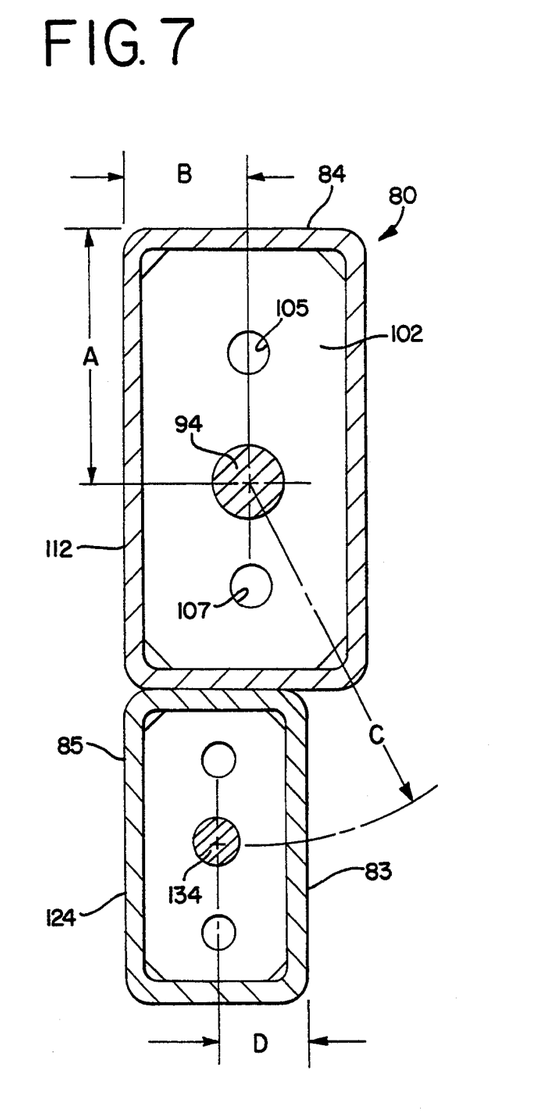
FIG. 7 is a sectional view taken along line 7—7 of FIG. 5.

For reasons discussed hereinafter, the second or auxiliary support structure 80 likewise has a hollow configuration. A web or block 102 is formed integral with or otherwise fixedly attached to the interior of the extension 80 toward that end which is adapted to be arranged in abutting relation with the first or main support structure 70. As shown, the guide pin 94 is secured to the web or block 102. Notably, and as shown in FIG. 7, guide pin 94 is centered and extends axially beyond the end of the support structure 80 at said first predetermined distance A from support surface 84 and at said second predetermined distance B from the support surface 85.

Opening 96 is specifically sized to snugly accommodate the pin 94 in a close sliding fit relationship when the first and second support structures 70 and 80 are arranged in abutting relation relative to each other. The limited surface contact established between the peripheral surface of guide pin 94 and the interior of opening 96 while facilitating alignment of the support surfaces 74, 75 on support structure 70 with support surfaces 84, 85 on support structure 80 allows a minimal amount of manual effort to arrange the support structures 70, 80 in alignment relative to each other. Moreover, guide pin 94 offers excellent shear strength qualities as one or more row units are laterally moved thereunto.

Figure 8:
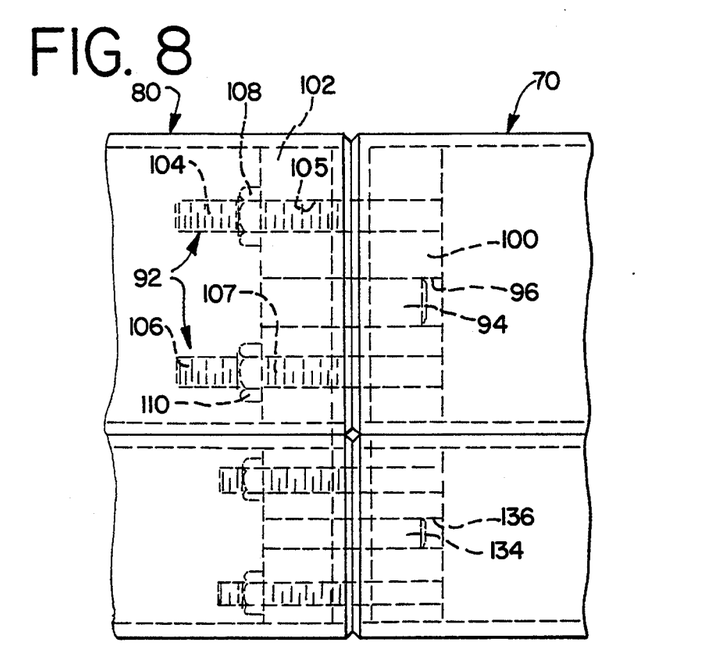
FIG. 8 is a view similar to FIG. 5 showing the support structures in an assembled relation relative to each other.

In the illustrated embodiment, the fasteners 92 for attaching the main support structure 70 and extension 80 to each other includes a pair of vertically spaced, threaded studs 104 and 106 having complementary threaded nuts or members 108 and 110 (FIG. 8), respectively, associated therewith. As shown in FIG. 8, one end of each stud 104, 106 is threadably secured and laterally extends from block 100 suitably secured within the hollow interior configuration of the main support structure 70. The length of each stud 104, 106 is such that the opposite end of each stud laterally extends beyond the end of main support structure 70 and laterally passes from one side and through apertures 105, 107 defined by the block 102 fixedly secured within the interior of extension 80. The apertures 105, 107 freely allow the studs 104, 106, respectively, to pass endwise therethrough. The nuts 108, 110 are threaded onto the free ends of the studs 104 and 106, respectively, from an opposite side of the block 102 to maintain the support surfaces of the main support structure 70 in alignment with the support surfaces on the auxiliary support or extension 80. Notably, in the illustrated embodiment, the fasteners 92 are arranged wholly within the interior of the tool bar assembly 32 so as to not interfere with movements of the row units along the support surfaces thereof.

Turning again to FIG. 5, to add strength and rigidity thereto, the main support structure 70 is preferably comprised of first and second tubular members 112 and 114. The tubular members 112, 114 are vertically disposed and secured to each other one on top of the other to improve torsional handling capacity of the tool bar assembly. In the illustrated embodiment, the tubular members 112, 114 are secured to each other as by welding or the like. Similarly, the second support member or extension 80 may be comprised of first and second tubular members 122 and 124 vertically disposed and attached one on top of the other and secured to each other as by welding or the like.

In the illustrated embodiment, when the support structures 70 and 80 are constructed of vertically disposed members, as shown, the fastening assembly 90 will further include an additional guide pin 134 which is snugly accommodated within a sized opening 136 for aligning the surfaces of the respective support structures and an additional pair of fasteners 142 for securing the lower members of the main support structure 70 and the auxiliary support structure 80 in alignment relative to each other. The guide pin 134, opening 136, and fasteners 142 are all substantially similar to like components discussed above. Suffice it to say, and as shown, the guide pin 134 is centered relative to the second tubular member 124 at predetermined distances C and D from the guide pin 94 and from the support surface 83 of tubular member 124, respectively. The opening 136 which accommodates the guide pin 134 is similarly centered on the second tubular member 114 of the main support 70 such that when the main support structure 70 and extension 80 are interconnected the support surface 73 on the first or main support structure 70 will align with the support surface 83 of the extension 80.

In the cotton harvester embodiment shown by way of example in the drawings, the tool bar assembly 32 is connected to the frame 12 forwardly of the front wheels of the harvester. If desired, two or three of the laterally adjustable row units 16 can be mounted on the main support structure 70 of the tool bar assembly 32. Once the harvester is received by the dealer or farmer, the tool bar assembly 32 can be easily extended by adding the extension 80 to the main support structure 70. As will be appreciated, extending the tool bar assembly 32 allows selective row spacing between the laterally adjustable row units 16.

To extend the tool bar assembly 32, the guide pin 94 of the fastening assembly 90 is accommodated with the sized opening 96 of the abuttable support structure thereby effecting alignment of the support surfaces 73, 74, and 75 of the support structure 70 with the support surfaces 83, 84, and 85 of the extension 80. Accordingly, the support structure 34 of a laterally adjustable row unit 16 will be readily movable from the main support structure 70 onto the extension 80. As will be appreciated, alignment between the support surfaces of the support structures reduces the amount of wear on the inserts 63, 64, and 65 of the support structure 34 as it passes over the joint between the support structures.

During assembly of the extension to the main support structure, the nuts 108 and 110 of the fastener assemblies are threaded onto the studs 104 and 106, respectively, and can be used for drawing the extension 80 toward the support structure 70. As will be appreciated, the fastener assemblies maintain the support surfaces of the extension 80 and main support structure 70 in aligned relationship with each other. Moreover, the guide pins 94 and 134 enhance the torsional handling capability of the tool bar assembly 32 in view of their high shear strength capabilities.

Upon disassembly of the extension 80 from the main support structure 70, the fasteners 92 and 142 of the attaching assembly 90 are threadably removed from the main support structure 70. Since the guide pins 94 and 134 are affixed to the extension 80, no portion of the attaching assembly 90 extends beyond the free end of the main support structure 70 when the extension 80 is disassembled therefrom thus facilitating transportation of the harvester.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A tool bar assembly suited for connection to a frame of an agricultural implement and on which a plurality of row units are mounted for lateral movement between opposite ends of the tool bar assembly, said tool bar assembly comprising:

a main support structure connected to said frame in a generally horizontal disposition, said main support structure having first and second ends with a continuous cross-sectional configuration extending therebetween, with the cross-sectional configuration of said main support structure including horizontal and vertical outer support surfaces extending between the ends of the main support structure and along which at least one row unit is moved between lateral locations;

an auxiliary support structure selectively attachable in an end-to-end abutting relationship relative to the main support structure for effectively extending the length of the tool bar assembly along which the row units are laterally moved, said auxiliary support structure having first and second ends with a cross-sectional configuration extending therebetween, and wherein the cross-sectional configuration of the auxiliary support structure is substantially similar to that of the main support structure and includes horizontal and vertical outer support surfaces extending between the ends of the auxiliary support structure and along which at least one row unit is laterally moved; and a fastener assembly for releasably fastening the support structures to each other, said fastener assembly comprising a pair of fasteners arranged wholly inwardly of the outer support surfaces for fastening the support structures in end-to-end abutting relation relative to each other and a guide pin located on and axially extending beyond an abutting end of one of said support structures, said guide pin being centered a first predetermined distance from the horizontal outer support surface of the respective support structure from which is extends and a second predetermined distance from the vertical outer support surface of the respective support structure, with an opening being defined toward the abutting end of the other support structure for accommodating said guide pin, said opening being centered said first predetermined distance from the horizontal outer support surface of the respective support structure and said second predetermined distance from the vertical outer support surface of the respective support structure, and wherein said opening is sized to establish a close sliding fit with said guide pin thereby aligning the outer support surfaces on the main and auxiliary support structures relative to each other such that the tool bar assembly is provided with substantially continuous support surfaces between opposite ends thereof and along which the row units are permitted to laterally move.

2. The tool bar assembly according to claim 1 wherein each fastener of said fastener assembly comprises a pair of threaded members extending generally parallel to said guide pin and from the abutting end of the main support structure, each threaded member having a length sufficient to extend lengthwise through an interior web at the abutting end of the auxiliary support structure such that a threaded nut can be affixed to the threaded member for drawing the support structures into abutting and secured relationship relative to each other.

3. A tool bar assembly suited for connection to a frame of an agricultural implement to permit a plurality of row units to be mounted thereon for lateral movement between opposite ends thereof and in side-by-side relation relative to each other, said tool bar assembly comprising:

a first support structure connected to said frame in a generally horizontal disposition, said first support structure being comprised of first and second vertically attached members, said first member defining first and second outer support surfaces extending between opposite ends of said first support structure and along which at least one row unit is supported for lateral movement, and wherein said second member defines a third outer support surface extending between opposite ends of said first support structure and along which said at least one row unit is supported for lateral movement;

a second support structure selectively attachable in an end-to-end abutting relationship relative to said first support member for effectively extending the length of the tool bar assembly along which one or more of the row units are laterally moved, said second support structure being comprised of first and second vertically attached members each having a cross-sectional configuration generally corresponding to that of the first member of the first support structure, with said first member of said second support structure defining first and second outer support surfaces extending between opposite ends thereof and along which another row unit is supported for lateral movement, and wherein said second member of the second support structure defines a third outer support surface extending between opposite ends thereof and along which said another row unit is supported for lateral movement; and a fastener assembly for releasably fastening the support structures to each other, said fastener assembly comprising first and second pin members located on and axially extending beyond the abutting end of one of said support structures, said first pin member being centered a first predetermined distance from the first outer support surface of the first member of the respective support structure from which it extends and a second predetermined distance from the second outer support surface of the first member of the respective support member, said second pin member being centered a third predetermined distance from said first pin member and a fourth predetermined distance from the third outer support surface of the second member of the respective support structure from which it extends, and wherein first and second openings are defined toward the abutting end of the other support structure for receiving and snugly accommodating said guide pins and thereby effecting alignment of the support surface on the respective support structures, said first opening being defined by the first member of the other support structure at said first and second predetermined distances from the first and second outer support surfaces thereof, respectively, and with the second opening being defined by the second member of the other support structure at said third and fourth predetermined distances from said first opening and said third outer support surface thereof, respectively, said fastener assembly further including a pair of fasteners for fastening each of the members of the support structures in end-to-end relation relative to each other and such that said outer support surfaces on the respective members of the support structures are maintained in alignment relative to each other to establish substantially continuous support surfaces between opposite ends of the tool bar assembly and which facilitates lateral movements of the row unit therealong.

4. The tool bar assembly according to claim 3 wherein each of said members of the support structure have a hollow interior configuration such that the pair of fasteners for fastening each of the members in end-to-end abutting relation are confined wholly within the interior of said structures.

5. The tool bar assembly according to claim 3 wherein the predetermined distance between the first and second guide pins is measured on an arc of a circle having a center at the axis of the first pin.

6. The tool bar assembly according to claim 3 wherein said first and third outer support surfaces of said support structures each have a generally vertical orientation while the second outer support surfaces of said support structures each have a generally horizontal orientation.

* * * * *